United States Patent
Wei et al.

(10) Patent No.: US 9,921,941 B2
(45) Date of Patent: Mar. 20, 2018

(54) VERIFICATION AND VALIDATION OF THIRD PARTY PLC CODE

(71) Applicant: Siemens Aktiengesellschaft, Munich (DE)

(72) Inventors: Dong Wei, Edison, NJ (US); Leandro Pfleger de Aguiar, Larenceville, NJ (US)

(73) Assignee: Siemens Aktiengesellschaft, Munich (DE)

( * ) Notice: Subject to any disclaimer, the term of this patent is extended or adjusted under 35 U.S.C. 154(b) by 114 days.

(21) Appl. No.: 14/683,215

(22) Filed: Apr. 10, 2015

(65) Prior Publication Data
US 2016/0299829 A1   Oct. 13, 2016

(51) Int. Cl.
| | | |
|---|---|---|
| G06F 9/44 | (2006.01) | |
| G06F 11/36 | (2006.01) | |
| H04L 29/06 | (2006.01) | |
| G06F 17/27 | (2006.01) | |
| G06F 21/57 | (2013.01) | |
| H04L 9/32 | (2006.01) | |

(52) U.S. Cl.
CPC ...... *G06F 11/3604* (2013.01); *G06F 11/3692* (2013.01); *G06F 17/2725* (2013.01); *G06F 21/57* (2013.01); *G06F 2211/009* (2013.01); *G06F 2221/2115* (2013.01); *H04L 9/321* (2013.01); *H04L 63/04* (2013.01); *H04L 63/0471* (2013.01)

(58) Field of Classification Search
CPC ......... H04L 9/32; H04L 63/04; H04L 9/3268; H04L 51/30; H04L 63/0471; G06F 2221/2115; G06F 21/57; G06F 17/2725; G06F 2211/009
See application file for complete search history.

(56) References Cited

U.S. PATENT DOCUMENTS

| | | | | |
|---|---|---|---|---|
| 6,442,441 B1 * | 8/2002 | Walacavage | ......... | G05B 19/056 341/173 |
| 8,990,783 B1 * | 3/2015 | Yu | ............. | G06F 8/35 703/22 |

(Continued)

OTHER PUBLICATIONS

Sebastian Biallas et al., Arcade.PLC: A Verification Platform for Programmable Logic Controllers, ACM, 2012, retrieved online on Nov. 7, 2017, pp. 338-341. Retrieved from the Internet<URL: http://delivery.acm.org/10.1145/2360000/2351741/p338-biallas. pdf?ip=151.207.250.71&id=2351741&acc=ACTIVE %20SERVICE &key=C15944E53D0ACA63%2E4D4702B0C3E38B35%2E4D4>.*

(Continued)

*Primary Examiner* — Hanh T Bui (57) ABSTRACT

A method for performing verification and validation of third party PLC code includes a marketplace computer receiving a program from a technology developer and identifying variables and operations included in the program. The marketplace computer performs (i) error handling testing on the program to yield error test results; (ii) vulnerability testing on the program to yield vulnerability test results; and (iii) performance testing of the program on target platforms to yield performance test results. Next, the marketplace computer generates a report based on the variables and operations included in the program, the error test results, the vulnerability test results, and the performance test results. This report may be sent by the marketplace computer to the technology developer.

16 Claims, 4 Drawing Sheets

(56) References Cited

U.S. PATENT DOCUMENTS

| | | | | |
|---|---|---|---|---|
| 2006/0236114 | A1* | 10/2006 | Yamamoto | G06F 21/105 713/176 |
| 2006/0294434 | A1* | 12/2006 | Ikeda | G06F 11/3688 714/38.1 |
| 2007/0083933 | A1* | 4/2007 | Venkatapathy | G06F 21/577 726/25 |
| 2008/0263525 | A1* | 10/2008 | Berg | G06F 8/43 717/131 |
| 2009/0119647 | A1* | 5/2009 | Kim | G06F 21/577 717/129 |
| 2010/0223212 | A1* | 9/2010 | Manolescu | G06Q 10/06 706/12 |
| 2011/0145795 | A1* | 6/2011 | Khanapurkar | G06F 11/3414 717/126 |
| 2012/0216244 | A1* | 8/2012 | Kumar | G06F 21/57 726/1 |
| 2013/0081036 | A1* | 3/2013 | Cohen | G06Q 10/06 718/102 |
| 2014/0258986 | A1* | 9/2014 | Wang | H04L 63/1408 717/126 |
| 2015/0143345 | A1* | 5/2015 | Patton | G06F 11/30 717/131 |
| 2016/0019132 | A1* | 1/2016 | Vilakkumadathil | G06F 9/44589 717/126 |

OTHER PUBLICATIONS

Simulink PLC Coder, MathWorks, retrieved online on Jan. 7, 2017, pp. 1-7. Retrieved from the Internet: <URL: https://www.mathworks.com/products/sl-plc-coder/features.html>.*

* cited by examiner

VERIFICATION AND VALIDATION OF THIRD PARTY PLC CODE

TECHNICAL FIELD

The present invention relates generally to systems, methods, and apparatuses for the verification and validation of third party source code associated with automation devices such as programmable logic controllers (PLCs). The disclosed technology may be applied to, for example, analyzing such source code for error conditions and security vulnerabilities.

BACKGROUND

Conventional automation systems need collaboration among different researchers, vendors, technology developers and system integrators. The different parties may collaborate via function blocks—software code that represents basic components upon which automation applications can be built. However, such collaboration requires a level of trust that may not be present among the parties. For example, a system integrator of metal industry may desire to buy a fuzzy logic control function block for a reheating furnace. The professional who developed the fuzzy logic control function block might be concerned about his intellectual property and encrypts/obfuscates his function block. The system integrator could also be concerned about whether the function block operates as advertised, or whether or not it correctly accesses device resources, such as inputs, outputs, memory, data blocks, counters and timers, as claimed and described. Since the function block is encrypted/obfuscated, it cannot be validated or verified by using cross-reference, provided by engineering systems, such as SIMATIC Manager and TIA Portal.

There are three choices for system integrators who want to integrate third party function blocks. First, the system integrators could buy out the function blocks from technology developers, and ask them to open the source code. Secondly, the system integrators could buy and use the function blocks without asking to open the source code, trusting the technology developers. Third, the system integrator develops their own function block rather than buying existing function blocks from technology developers. The first choice is not welcomed by technology developers, who usually prefer to sell their technologies to different system integrators in different industries, and they worry about their IP and are not willing to lock-in to certain products or platforms. The second choice requires system integrators trust technology developers, which sometimes may not work, since the end users would come to system integrators if there are issues during operation, but these issues come from those black box—function blocks provided by the technology developers. In the last choice, system integrators have to develop technologies that they may not be good at, so it is not very efficient. Accordingly, it is desired to produce a verification and validation process which allows system integrators and other users to trust third party code produced by technology developers, while addressing the deficiencies of the choices presented above.

SUMMARY

Embodiments of the present invention address and overcome one or more of the above shortcomings and drawbacks, by providing methods, systems, and apparatuses related to the automatic verification and validation of source code associated with programmable logic controllers (PLCs). Briefly, an intermediary party between a technology developer and a vendor (or other end user) performs verification and validation analysis on the technology developer's code and generates a report. This report may be provided back to the technology developer to allow for correction, adjustment, or other revision of the code. Additionally, in some embodiments, once the code is released (e.g., via an electronic marketplace, similar to Google Play Store and Apple App Store), portions of the report may be provided to the vendor, indicating whether the code has passed various types of tests (e.g., performance testing, vulnerability testing, etc.).

According to some embodiments, a method for performing verification and validation of third party PLC code includes a marketplace computer receiving a program from a technology developer and identifying variables and operations included in the program. The marketplace computer performs (i) error handling testing on the program to yield error test results; (ii) vulnerability testing on the program to yield vulnerability test results; and (iii) performance testing of the program on target platforms to yield performance test results. Next, the marketplace computer generates a report based on the variables and operations included in the program, the error test results, the vulnerability test results, and the performance test results. This report may be sent by the marketplace computer to the technology developer.

In some embodiments of the aforementioned method, in response to sending the report to the technology developer, a request is received from the developer requesting release of the program. One of an approval decision or a rejection decision is then generated based on one or more of error test results, the vulnerability test results, and the performance test results. If the approval decision is generated, the program is released via an electronic marketplace. Conversely, if the rejection decision is generated, a notification of rejection may be sent to the technology developer. In some embodiments, the electronic marketplace comprises one or more webpages accessible to users over a network. Descriptive information for the program may be generated using the report and provided via the marketplace. This descriptive information may include, for example, an indication of performance of the program on one or more computing platforms (e.g., a minimum, maximum and average time associated with execution of the program on each of the computing platforms).

Various enhancements may be made to the aforementioned method in different embodiments. For example, in some embodiments, the marketplace operator enters into a non-disclosure agreement corresponding to the program prior to beginning testing. The type of testing performed may also vary. For example, in some embodiments, the error testing and the vulnerability testing are performed by a static program analysis of source code associated with the program, whereby the program is not executed during the error handling testing and the vulnerability testing. In other embodiments, this test is performed by a dynamic program analysis of code associated with the program, whereby the program is executed during the error handling testing and the vulnerability testing.

According to other embodiments, a method of performing verification and validation of a software program for distribution on an electronic marketplace includes receiving a testing application from a marketplace provider and performing testing of a program using the testing application to yield test results. In some embodiments, this testing includes identifying variables and operations included in the program; performing error testing on the program to yield error test results; and performing vulnerability testing on the program to yield vulnerability test results. A digitally signed report may then be generated based on the test results. This report may then be sent, along with the program, to the marketplace provider. In one embodiment, the program is encrypted prior to transmission. In response to the digitally signed report and the program, the marketplace provider may send performance test results indicative of performance of the program on target platforms. Once the program is ready to be released, a message may be sent to the marketplace provider requesting release of the program via the electronic marketplace.

According to other embodiments, a system for performing verification and validation of third party code includes network communication component, a testing processor, and a report generation component. The network communication component is configured to receive a program from a technology developer. The testing processor is configured to: identify variables and operations included in the program, perform error testing on the program to yield error test results, perform vulnerability testing on the program to yield vulnerability test results, and use one or more target platforms to perform performance testing on the program to yield performance test results. The report generation component is configured to generate a report based on the variables and operations included in the program, the error test results, the vulnerability test results, and the performance test results. This report may then be sent back to the technology developer (e.g., via the network communication component).

Some embodiments of the aforementioned system further include a marketplace listing component which is configured to release the program via one or more electronic marketplaces. In one embodiment, this marketplace listing component is further configured to provide descriptive information for the program associated with the report to each of the one or more electronic marketplaces for distribution with the program.

In some embodiments of the aforementioned system, the testing processor performs the error testing and the vulnerability testing using a static program analysis of source code associated with the program, whereby the program is not executed during the error testing and the vulnerability testing. In other embodiments, the target platforms perform the error handling testing and the testing processor performs the vulnerability testing using a dynamic program analysis of source code associated with the program, whereby the program is executed during the error handling testing and the vulnerability testing.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to a platform on which participants, such as researchers, technology developers, vendors (e.g., Siemens®), and system integrators, can collaborate more efficiently. Briefly, techniques are described for validating and verifying function blocks using an intermediary service between the technology developer and the end user. This service may be provided, for example, by an automation marketplace owner and operator such as Siemens®. Additionally, in some embodiments, the services provided by the marketplace operator may be supplemented by third parties including, for example, a safety agency that performs verification & validation and co-signs the verified code; an entity that provides IEC 62443/ISASecure/Achilles certification for the application; and/or a sector specific agency to achieve vertical specific certification. The method, systems, and apparatuses described in various embodiments herein can enhance various industrial automation system products, for example, by eliminating barriers for the function blocks content community and by providing a new mechanism/ scheme to detect security vulnerabilities thus minimizing their potential adverse later impacts on production systems. It should be noted that, although the various techniques are described with reference to the distribution of function blocks associated with automation code, the systems, methods, and apparatuses described herein may be generally applied to the distribution of any type of PLC code.

Figure 1:
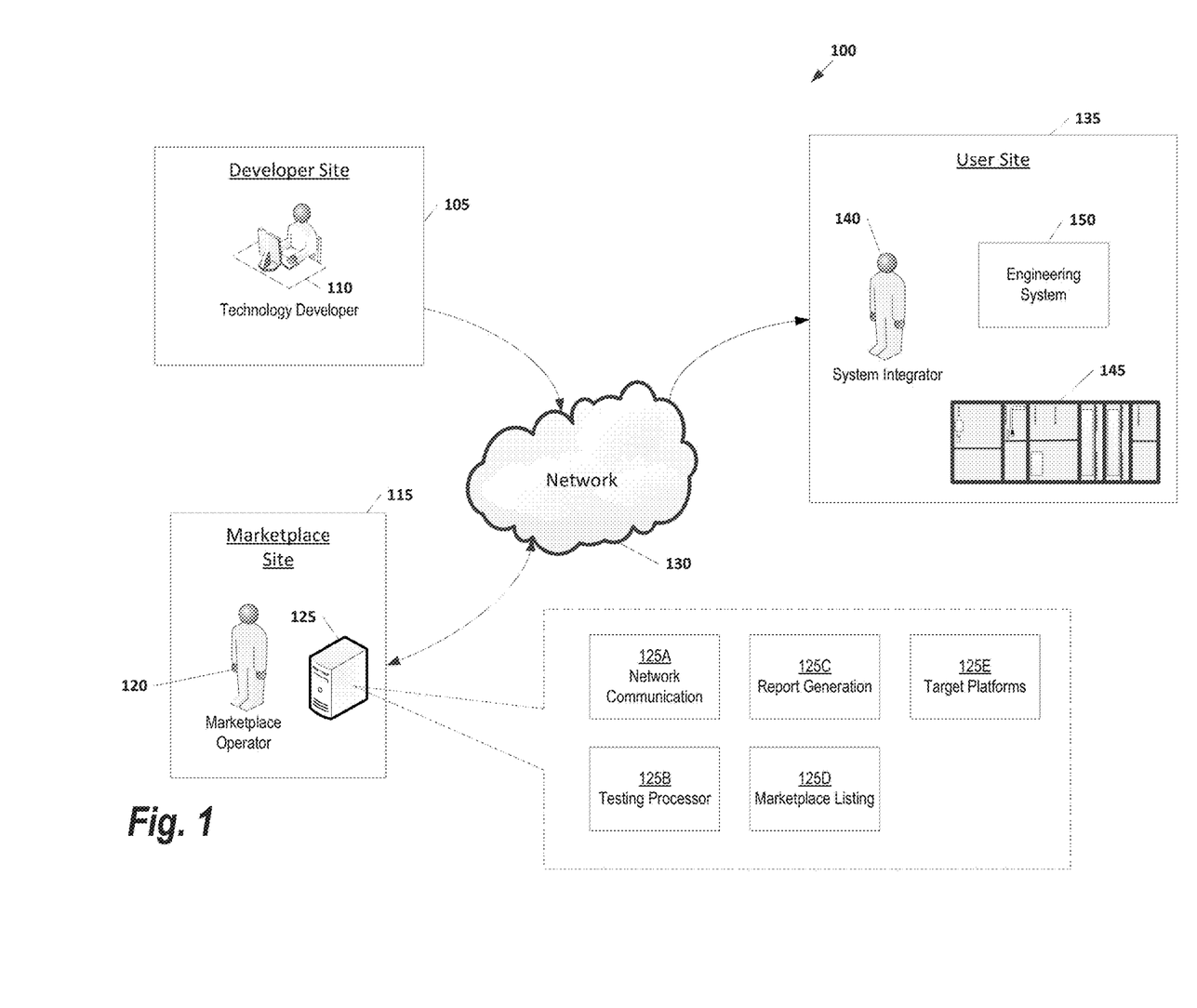
FIG. 1 provides an overview of a system for performing verification and validation of function blocks, according to some embodiments.

FIG. 1 provides an overview of a system 100 for performing verification and validation of function blocks, according to some embodiments. The example illustrated in FIG. 1 is divided into three locations: a Technology Development Site 105, a Marketplace Site 115, and an End User Site 135. These three locations 105, 115, 135 are connected via Network 130. The Network 130 may be implemented using a variety of hardware platforms and communication tools. For example, the Network 130 may be implemented using the IEEE 802.3 (Ethernet) or IEEE 802.11 (wireless) networking technologies, either separately or in combination. In some embodiments, the Network 130 is implemented using the Internet. In other embodiments, for example where security may be a concern, the Network 130 may be a corporate intranet.

Function blocks are created by technology developers in development environments at the Technology Development Site 105 in FIG. 1. A Technology Developer 110 operating at the Technology Development Site 105 can develop function block(s) targeted for execution on an automation device (e.g., Automation Device 145) in variety of ways. For example, in some embodiments, applications may be developed using conventional standards-based IEC 61311 programming languages (e.g., ladder diagram, function block diagram, structured text, instruction list, etc.). Additionally, one or more Software Development Kits (SDKs) and/or Application Programming Interface (API) may be used in developing applications for a particular class of devices.

The Marketplace Site 115 is run by a Marketplace Operator 120. This Marketplace Operator 120 interacts with the Technology Developer 110 to perform the verification and validation process. The Technology Developer 110 initiates communication with the Marketplace Operator 120 and indicates that the Technology Developer 110 desires to have the Marketplace Operator 120 perform verification and validation testing on one or more function blocks developed by the Technology Developer 110. The Marketplace Operator 120 and the Technology Developer 110 may enter into one or more confidentiality agreements. Then, the Technology Developer 110 may provide the Marketplace Operator 120 with direct access to the source code and/or object code associated with the function blocks created by the Technology Developer 110. The Technology Developer 110 may provide the code, for example, by DVD via a mail service or the code may be electronically transferred from Technology Developer 110 to a Network Communication Component 125A at the Verification and Validation Computer 125 at the Marketplace Site 115. With respect to electronic transfer, various techniques may be used including, without limitation, e-mail, upload via a webpage form, or use of File Transfer Protocol (or a similar protocol or service). In addition to the code for the function block(s), the Technology Developer 110 may provide appropriate metadata including, for example, information about the target environment, a detailed project description of the claimed performed behavior, and/or an example project to the Marketplace Operator 120.

Once the Marketplace Operator 120 has the source code, it performs one or more verification and validation tasks on the code using a Verification and Validation Computer 125. It should be noted that, although the Verification and Validation Computer 125 is shown at the Marketplace Site 115 in the embodiment illustrated in FIG. 1, in other embodiments, remote computers may be used for performing the verification and validation tasks.

In the example of FIG. 1, the Verification and Validation Computer 125 includes several components for performing the analysis. As described above, a Network Communication Component 125A is configured to receive the function block(s) from the Technology Developer 110 using any of a variety of networking techniques generally known in the art. A Testing Processor 125B is configured to identify variables and operations included in the function block(s) and resources needed by the function block(s) (e.g., timers, counters, system functions and system function blocks), perform error handling testing on the function block(s) to yield error handling test results and perform vulnerability testing on the function block(s) to yield vulnerability test results.

Additionally, the Testing Processor 125B may perform performance testing on the function block(s) to yield performance test results on Target Platforms 125E. The Target Platforms 125E are a set of computing platforms (e.g., Siemens® S7-1200, S7-1500, etc.) used for testing purposes. In some embodiments, the exact platforms used for testing are specified by the Technology Developer 110, while in other embodiments a default set of platforms may be used. The test results generated by the Testing Processor 125B help to identify differences in responsiveness and real-time performance on different Target Platforms 125E due to factors such as, without limitation, computational power and memory space on Target Platforms 125E. Following testing, a Report Generation Component 125C generates a report based on the variables and operations included in the function block(s), the error handling test results, the vulnerability test results, and the performance test results.

Once the report is generated by the Report Generation Component 125C, it may be communicated back to the Technology Developer 110 (e.g., using the Network Communication Component 125A) to allow for correction, revision, or other adjustment of the code associated with the function block. Then the Technology Developer 110 may resubmit the code to the Marketplace Operator 120 and the verification and validation tasks may be repeated.

With respect to code verification and validation analysis, it should be noted that FIG. 1 provides an example of code verification remotely at the Marketplace Site 115. In some embodiments, this analysis may be performed locally at the Technology Development Site 105 instead. For example, in some embodiments, a signed standalone application delivered by the Marketplace Operator 120 may be installed at the Technology Development Site 105 to provide the verification and validation of the source code locally. A signed electronic report (e.g., using the Technology Developer's 110 certificate previously approved/accepted as a developer's certificate by the Marketplace Operator 120) including the cryptographic hash of the source code, the compiled binary, and a proof of the association between these two, may then be sent to Marketplace Operator 120 or another verifying party.

Once the Technology Developer 110 has approved the function block for distribution, the Marketplace Operator 120 may encrypt/obfuscate and digitally sign the function blocks developed by the Technology Developer 110 and list them on an electronic marketplace store accessible via the Marketplace Site 115. In the example of FIG. 1, a Marketplace Listing Component 125D at the Verification and Validation Computer 125 is configured to handle any necessary tasks associated with publishing the listing (e.g., account management, generation of listing information, etc.). In some embodiments, the Marketplace Listing Component 125D is further configured to provide descriptive information detailing the results of the verification and validation analysis to the marketplace store for distribution with the function blocks.

In some embodiments, the marketplace store includes a web-based store interface (e.g., similar to mobile app stores such as the Apple® App Store℠ and Google® Play Store℠), where users can browse through different categories of function block view descriptive information about each function block (including information from the verification and validation analysis), and acquire function block. The electronic marketplace store may also provide information such as reviews or ratings with each app. In one embodiment, the marketplace store also handles any financial transactions associated with acquiring function block. For example, the Technology Developer 110 and the Marketplace Operator 120 may set a price for each function block uploaded to the marketplace store. Upon a purchase of one of the Technology Developer's 110 function block, the marketplace store will send the funds to the Technology Developer 110. A portion of the funds representing commission fees due to the marketplace store may be automatically deducted by marketplace store prior to transmission to the Technology Developer 110. In some embodiments, the marketplace store may include security related functionality. For example, in one embodiment, the marketplace store notifies a user device that a function block was found to include malicious software or critical errors, for example, based on an updated verification and validation analysis information.

At an End User Site 135, a System Integrator 140 retrieves PLC code from the Marketplace Operator 120 (purchasing, if necessary) and then implements a complete automation application on the user's Automation Device 145. Thus, continuing with the example of function block(s) discussed above, the System Integrator 140 retrieves the function block(s) developed by the Technology Developer 110 from the Marketplace Operator 120. Once retrieved, the function block(s) are then used to implement an automation application on the Automation Device 145. The Automation Device 145 may include, for example, a programmable logic controller (PLC), a field device, or any other automation device known in the art and capable of executing the function block(s). An operating system on the Automation Device 145 facilitates the execution of the function block(s). In some embodiments, a marketplace client application operating on the Automation Device 145 communicates with the marketplace to download function block. The communication between the Automation Device 145 and the Marketplace Operator 120 may be triggered automatically or based on some user input. An Engineering System 150 handles function blocks and licenses used at the User Site 135. Products of the Engineering System 150 may include, for example, Siemens® SIMATIC Manager and TIA Portal software. The System Integrator 140 receives and stores the licenses of function block(s) in the Engineering System 150 for later download to the Automation Device 145.

It should be noted that, while this example shows a System Integrator 140 as the end user of the function block(s) developed by the Technology Developer 110, the general concepts presented in FIG. 1 can be extended to any type of end user. For example, rather than a system integrator, a vendor, customer, or other end user of the function block(s) may communicate with the electronic marketplace to retrieve the function block(s) and any related descriptive information, as described above. Similarly, the system may be applied outside of the context of automation software. For example, rather than function block(s), the Technology Developer 110 may develop mobile applications which then undergo verification and validation testing by the Marketplace Operator 120, as discussed above, prior to distribution to end users.

Figure 2:
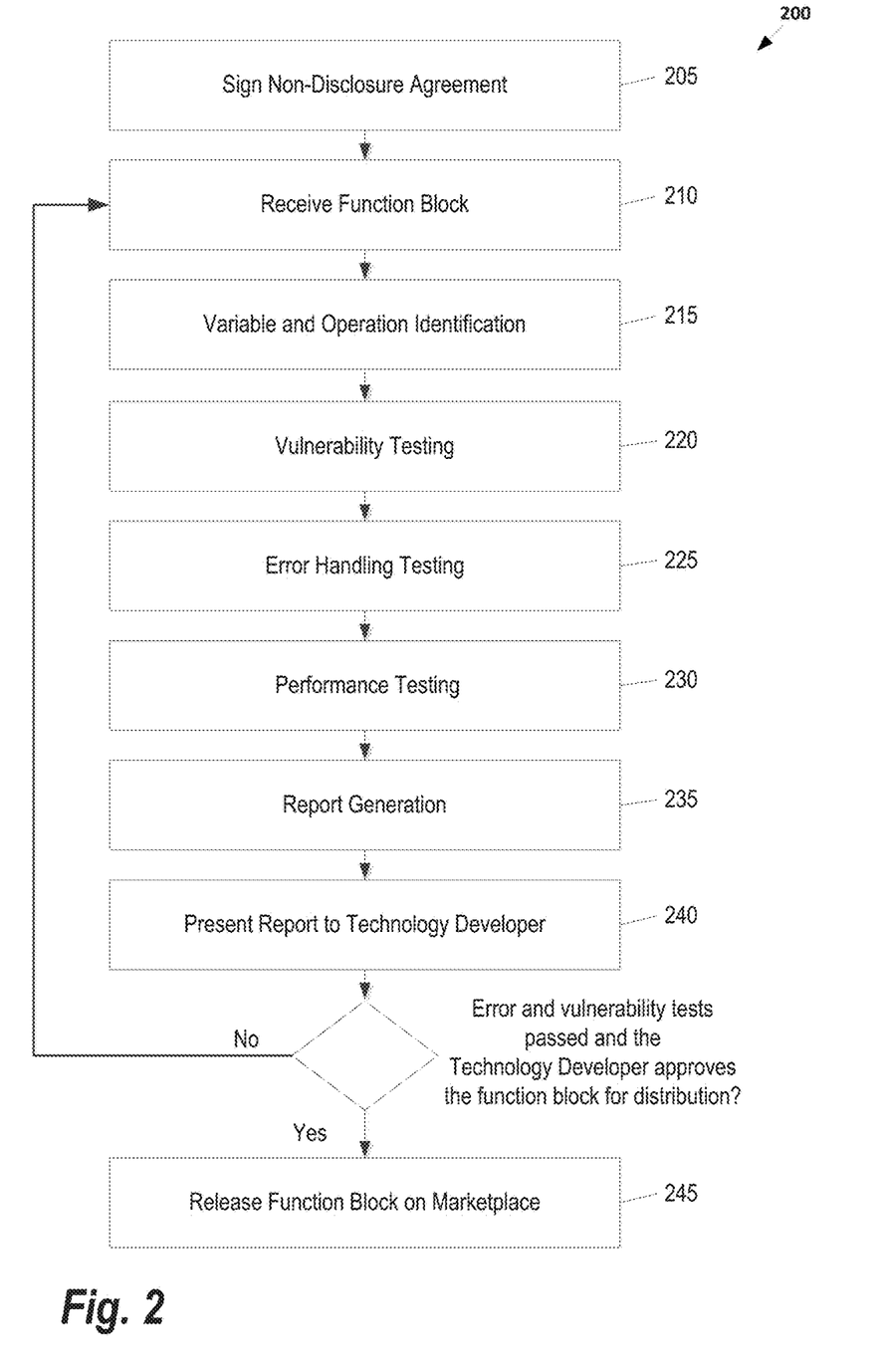
FIG. 2 provides a process that may be used to perform verification and validation testing of source code associated with third party function blocks (or other automation system code), according to some embodiments.

FIG. 2 provides a process 200 that may be used to perform verification and validation testing of source code associated with third party function blocks (or other automation system code), according to some embodiments. The entity performing these tasks may be, for example, a marketplace owner/operator (e.g., Marketplace Operator 120 in FIG. 1). Alternatively, performance of one or all of the tasks may be outsourced to another service provider, and the developers who want to sell the technology function block on the automation marketplace are charged accordingly. For the description provided below with respect to FIG. 2, it is assumed that a marketplace operator is performing the verification and validation testing.

At step 205, the marketplace operator optionally enters into a Non-Disclosure Agreement (NDA) with technology developers who develop the PLC source code. Because source code may need to be disclosed as party of the verification/validation process, the NDA may detail the confidential material, knowledge, or information (including the source code) that the technology developers and marketplace owner/operator wish to share for verification/validation purposes, but wish to restrict access to or by third parties. In some embodiments, the NDA may be a paper document signed by the parties. In other embodiments, the NDA may be a digital agreement entered into the parties using one or more techniques known in the art (e.g., a click-through agreement, an agreement digitally signed by the parties, etc.). The NDA may be unilateral or bilateral in nature (e.g., it may bind only marketplace owner/operator or both the technology developers and marketplace owner/operator).

Once the NDA has been signed by the parties, the technology developer submits source code for the function block to the marketplace owner/operator who, in turn, receives the code at 210. Next, the marketplace operator performs a series of tests to analyze the submitted source code. This analysis may be performed manually in some instances by an individual tasked with reviewing the function block or, alternatively, automated tools may be used for one or more of the tasks. For example, in some embodiments, static program analysis techniques known in the art are used to analyze the code of the function block without actually executing it. This analysis may be performed on either the source code or any corresponding object code. In other embodiments, dynamic program analysis techniques known in the art may be used, executing the function block on a real or virtual processor. A standard set of inputs designed to test for known error condition may be used as input to the function block during the dynamic program analysis. Additionally, software testing measures known in the art such as code coverage may be used to ensure that an adequate slice of the function block's set of possible behaviors has been tested. In some embodiments, simulation-based techniques may also be used for testing. For example, in some embodiments, the technology developer provides detailed metadata information (e.g. piping and instrumentation diagrams) that allows the validator to simulate the process with the code.

At step 215 a pre-processing stage is performed to identify variables and related operations. A cross-reference check may be performed to generate cross-reference data associated with the function block. The cross-reference data may include, for example a listing of the use of addresses and blocks used by the technology developer's function block. For each address used by the function block, the absolute address may be provided, along with information such as related symbols, the block in which the address is used, how the address is used (i.e., read or write) and the position at which the address is used. Configuration data operation, such as fieldbus station numbers and system clock, may be scrutinized carefully. Additionally, in some embodiments, a cross reference table is generated of all variables, including local variables in the technology developer's function block.

The results of step 215 may include, without limitation, the function block's footprint (e.g., memory usage in kB and overall function block size); a list of used peripheral inputs and outputs; used process images of inputs and outputs; used timers and counters; used memory map (e.g., bits and bytes); used data blocks and system data blocks; used functions and function blocks; used system functions; and system function blocks; and configuration data operations.

Once the variable operations have been identified, safety testing and/or security compliance testing (e.g., ISASecure) may optionally be performed on the function block. Then, at step 220, the function block is tested for security vulnerabilities. The vulnerability testing performed at 220 may be based on, for example, a list of known vulnerabilities for automation system code. For example, code which allows remote access from an unauthorized source may be flagged at 220 as a potential vulnerability. The list may be expressed, for example, in terms of vulnerable instruction sets such that the marketplace operator can test the code via a manual or automatic scan. Additionally (or alternatively), one or more security vulnerability tests may be performed on the function block. For example, to continue with the previous example, the function block may be executed in a simulated environment and test code may be used to try to access the function block without authorization. The information used to perform the vulnerability testing at step 220 may be updated periodically as new security vulnerabilities become known. In some embodiments, fuzz testing techniques may also be used to provide invalid, unexpected, or random data to the inputs to the automation system code to detect conditions such as, without limitation, crashes, failing built-in code assertions, or memory leaks.

Next, at step 225, tests are performed to confirm that applications developed based on the function block can handle errors properly and not crash the target platforms. For example, if a peripheral output is offline, the function block should properly raise (and potentially handle) the exception without crashing or otherwise causing undesirable system behavior. The exception handling analysis may be performed, for example, by using the example project created by the technology developers or using a standard project for a particular type of function block. As part of the marketplace operator verification and validation procedures, simulation resources might be leveraged as an option to supplement the semantic validation tasks.

The results of steps 220 and 225 may include, for example, a listing of all tests performed and whether the function block passed or failed each respective test; confirmation of proper exception handling, and an indication of correct and authorized use of extensions. Additionally, the results may include detailed information regarding introduced vulnerabilities, bugs; use of banned/unauthorized operations or functions; detection of crashes and hangs/fuzzing (e.g. adversary-controlled inputs to looping structures, paths leading to outputs whose space or time usage could potentially result in data leak); side channel attacks; and/or a list of read or write data operations outside its designated container area. In some embodiments, the results of steps 220 and 225 may include references to particular lines of code included in function block that are error prone or introduce vulnerabilities.

At 230, performance testing is performed on the function block to determine performance, for example, in terms of minimum, maximum, and average time in million seconds on target platforms. Additionally, in some embodiments, the performance testing performed at step 230 also validates the footprint of the function block, for example, in Kilobytes (kB). This testing may be performed, for example, by using the example project created by the technology developers or using a standard project for a particular type of function block. Target platforms may be submitted by the technology developer, for example, using system names and models (e.g., "Simatic S7-314, S7-412"). Additionally (or alternatively), step 230 may evaluate performance against a standard set of target platforms selected, for example, based on the functionality provided by the function block. Various techniques may be used to carry out the performance testing at 230. For example, in some embodiments, the performance testing is implemented using physical hardware corresponding to the test platform. In other embodiments, virtual versions of that hardware may be used. The results of step 230 may be provided, for example, in terms of running time, such as minimum, maximum and average time in million seconds, on the different target platforms.

At 235 the marketplace operator generates a report detailing the results of the verification and validation analysis performed at steps 215-230. This report is then presented to the technology developer at step 240. If the function block passes the error and vulnerability tests performed at steps 220 and 225 and the technology developer approves the function block for distribution, at step 245 the function block is released to the marketplace for distribution to end users. As part of the release, information from the report may be provided to end users via the marketplace to aid in the decision of whether or not to download and install the function block. Additionally (or alternatively), the marketplace operator may provide a certification that the function block passed the marketplace operator's battery of tests. In this way, the end user can rely on the marketplace operator as a trusted third party without necessarily reviewing the details of the testing results. If the testing results are not passed, or if the technology developer for whatever reason decides not to release the function block, the technology developer may resubmit the function block, possibly with revisions to address the results of the testing. Thus, the process can repeat at step 210, as shown in FIG. 2.

The order of the steps shown in FIG. 2 is merely one example and, in other embodiments, the steps may be performed in a different order and/or in parallel. In addition, the list of steps presented in the process 200 is not intended to be exhaustive—additional steps may be added in some embodiments. Conversely, in other embodiments, the verification and validation process may involve fewer steps than those shown in FIG. 2.

Figure 3:
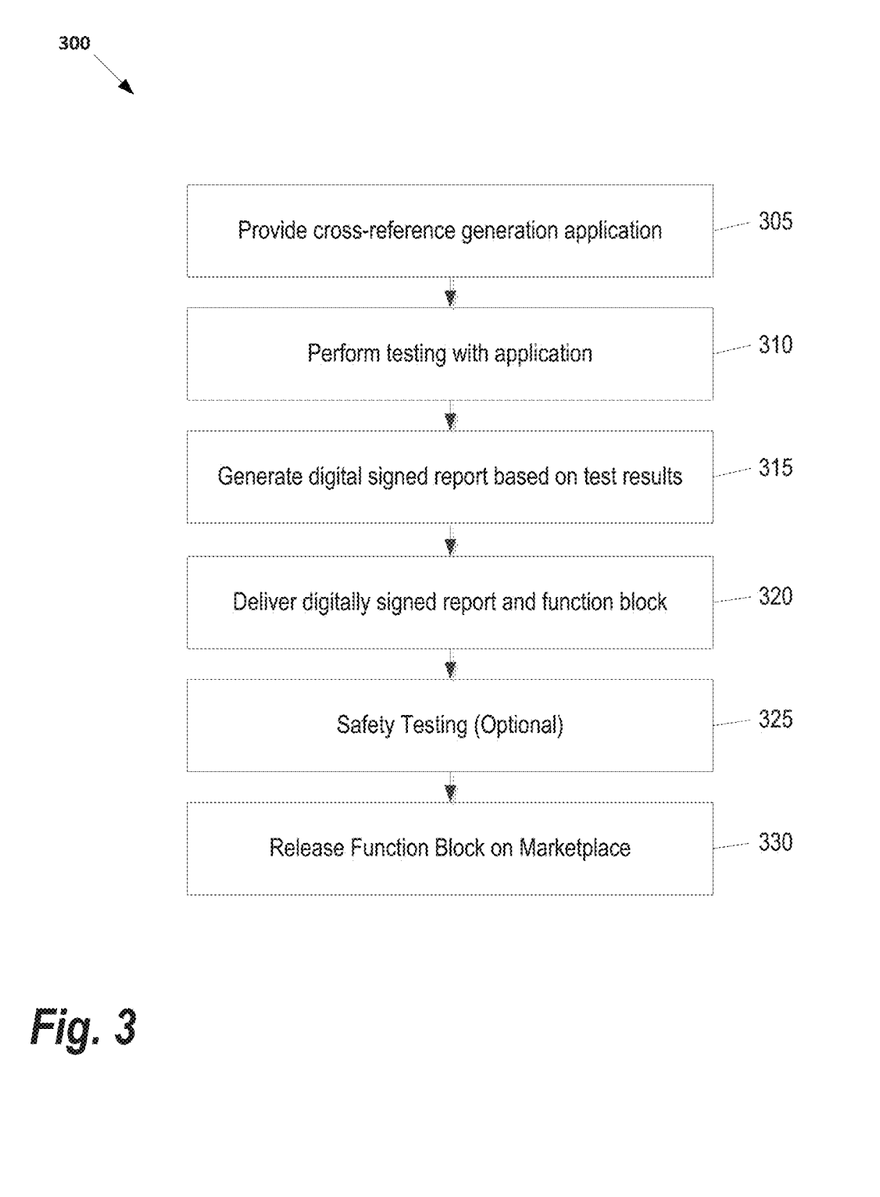
FIG. 3 provides a process which allows the marketplace operator to process a function block without direct access to the source code, according to some embodiments.

Note that the process 200 in FIG. 2 may require that all market participants, especially the technology developers, trust the marketplace operator. In some instances, the technology developer may not want to expose the source code to the marketplace operator. FIG. 3 provides a process 300 which allows the marketplace operator to process a function block without direct access to the source code, according to some embodiments. At 305, the marketplace operator provides a cross reference generation application under App Development Kit to technology developers. At 310, the cross reference generation application performs the verification and validation tests detailed in steps 220-225 using, for example, static or dynamic code analysis techniques. Then, at 315, the results of the tests are used to create a digitally signed report. The digitally signed report provides a unique electronic "fingerprint" for the test results, binding the results with a generated digital signature. Any changes made to the test results after it has been signed invalidate the signature, thereby protecting the results against information tampering (e.g., by the technology provider). Accordingly, the digitally signed report helps to provide authenticity, accountability, data integrity and the non-repudiation of the test results, even though they were generated remotely at the technology developer's site. The type of digital signature used at 315 may vary according to different embodiments and may include, without limitation, electronic signatures, advanced electronic signatures, or qualified digital signatures. Any technique generally known in the art may be used in generating the digital signature used to create the digitally signed report. Using these techniques, both the report and the code may be signed (co-signed) by all verification and validation parties.

Continuing with reference to FIG. 3, at 320, the technology developer submits digitally signed report, along with the function block to the marketplace. In some embodiments, the function block is encrypted prior to transmission using one or more encryption techniques generally known in the art. In some embodiments, the technology developer also provides an example project to the marketplace operator. Next, at 325, the marketplace operator optionally performs safety testing and/or security compliance testing (e.g., ISASecure) on the function block. In some embodiments, safety testing may be performed by a third party safety agency as an alternative to the marketplace operator. Finally, at 330, the function block is released to the marketplace for distribution to end users.

Figure 4:
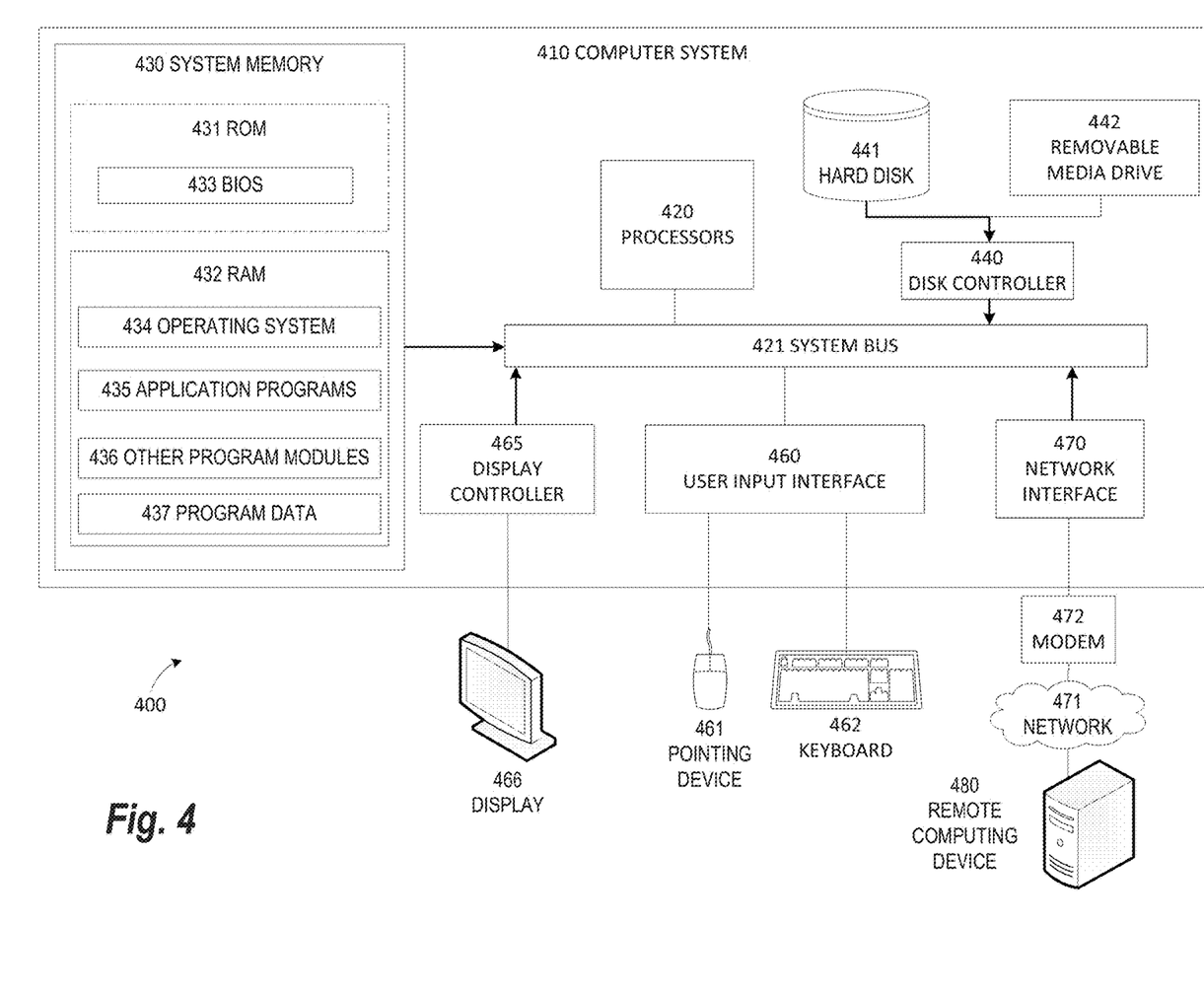
FIG. 4 illustrates an exemplary computing environment within which embodiments of the invention may be implemented.

FIG. 4 illustrates an exemplary computing environment 400 within which embodiments of the invention may be implemented. For example, this computing environment 400 may be used to implement the Verification and Validation Computer 125 shown in FIG. 1 and execute the process 200 described in FIG. 2. The computing environment 400 may include computer system 410, which is one example of a computing system upon which embodiments of the invention may be implemented. Computers and computing environments, such as computer system 410 and computing environment 400, are known to those of skill in the art and thus are described briefly herein.

As shown in FIG. 4, the computer system 410 may include a communication mechanism such as a bus 421 or other communication mechanism for communicating information within the computer system 410. The computer system 410 further includes one or more processors 420 coupled with the bus 421 for processing the information. The processors 420 may include one or more central processing units (CPUs), graphical processing units (GPUs), or any other processor known in the art.

The computer system 410 also includes a system memory 430 coupled to the bus 421 for storing information and instructions to be executed by processors 420. The system memory 430 may include computer readable storage media in the form of volatile and/or nonvolatile memory, such as read only memory (ROM) 431 and/or random access memory (RAM) 432. The system memory RAM 432 may include other dynamic storage device(s) (e.g., dynamic RAM, static RAM, and synchronous DRAM). The system memory ROM 431 may include other static storage device(s) (e.g., programmable ROM, erasable PROM, and electrically erasable PROM). In addition, the system memory 430 may be used for storing temporary variables or other intermediate information during the execution of instructions by the processors 420. A basic input/output system (BIOS) 433 containing the basic routines that help to transfer information between elements within computer system 410, such as during start-up, may be stored in ROM 431. RAM 432 may contain data and/or program modules that are immediately accessible to and/or presently being operated on by the processors 420. System memory 430 may additionally include, for example, operating system 434, application programs 435, other program modules 436 and program data 437.

The computer system 410 also includes a disk controller 440 coupled to the bus 421 to control one or more storage devices for storing information and instructions, such as a hard disk 441 and a removable media drive 442 (e.g., floppy disk drive, compact disc drive, tape drive, and/or solid state drive). The storage devices may be added to the computer system 410 using an appropriate device interface (e.g., a small computer system interface (SCSI), integrated device electronics (IDE), Universal Serial Bus (USB), or FireWire).

The computer system 410 may also include a display controller 465 coupled to the bus 421 to control a display 466, such as a cathode ray tube (CRT) or liquid crystal display (LCD), for displaying information to a computer user. The computer system includes an input interface 460 and one or more input devices, such as a keyboard 462 and a pointing device 461, for interacting with a computer user and providing information to the processor 420. The pointing device 461, for example, may be a mouse, a trackball, or a pointing stick for communicating direction information and command selections to the processor 420 and for controlling cursor movement on the display 466. The display 466 may provide a touch screen interface which allows input to supplement or replace the communication of direction information and command selections by the pointing device 461.

The computer system 410 may perform a portion or all of the processing steps of embodiments of the invention in response to the processors 420 executing one or more sequences of one or more instructions contained in a memory, such as the system memory 430. Such instructions may be read into the system memory 430 from another computer readable medium, such as a hard disk 441 or a removable media drive 442. The hard disk 441 may contain one or more data stores and data files used by embodiments of the present invention. Data store contents and data files may be encrypted to improve security. The processors 420 may also be employed in a multi-processing arrangement to execute the one or more sequences of instructions contained in system memory 430. In alternative embodiments, hard-wired circuitry may be used in place of or in combination with software instructions. Thus, embodiments are not limited to any specific combination of hardware circuitry and software.

As stated above, the computer system 410 may include at least one computer readable medium or memory for holding instructions programmed according to embodiments of the invention and for containing data structures, tables, records, or other data described herein. The term "computer readable medium" as used herein refers to any medium that participates in providing instructions to the processor 420 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 441 or removable media drive 442. Non-limiting examples of volatile media include dynamic memory, such as system memory 430. Non-limiting examples of transmission media include coaxial cables, copper wire, and fiber optics, including the wires that make up the bus 421. Transmission media may also take the form of acoustic or light waves, such as those generated during radio wave and infrared data communications.

The computing environment 400 may further include the computer system 410 operating in a networked environment using logical connections to one or more remote computers, such as remote computer 480. Remote computer 480 may be a personal computer (laptop or desktop), a mobile device, a server, a router, a network PC, a peer device or other common network node, and typically includes many or all of the elements described above relative to computer system 410. When used in a networking environment, computer system 410 may include modem 472 for establishing communications over a network 471, such as the Internet. Modem 472 may be connected to bus 421 via user network interface 470, or via another appropriate mechanism.

Network 471 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 410 and other computers (e.g., remote computer 480). The network 471 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 471.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity. Also, while some method steps are described as separate steps for ease of understanding, any such steps should not be construed as necessarily distinct nor order dependent in their performance.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A method for performing verification and validation of third party programmable logic controller (PLC) code, the method comprising:
   receiving, by a marketplace computer, a function block and metadata indicating functionality provided by the function block from a technology developer;
   identifying, by the marketplace computer, variables and operations included in the function block and one or more automation system resources required by the function block;
   performing, by the marketplace computer, error handling testing on the function block to yield error test results;
   performing, by the marketplace computer, vulnerability testing on the function block using a list of known vulnerabilities for automation system code to yield vulnerability test results;
   performing, by the marketplace computer, performance testing of the function block using an example project on target platforms to yield performance test results, wherein the target platforms are selected based on the functionality provided by the function block;
   generating, by the marketplace computer, a report based on the variables and operations included in the function block, the error test results, the vulnerability test results, the performance test results, and the one or more automation system resources required by the function block;
   sending, by the marketplace computer, the report to the technology developer; and
   in response to sending the report to the technology developer, receiving a request from the developer requesting release of the function block;
   generating one of an approval decision or a rejection decision based on one or more of the error test results, the vulnerability test results, and the performance test results; and
   if the approval decision is generated, releasing the function block via an electronic marketplace with a certification that the function block passed one or more of the error handling testing, the vulnerability testing, and the performance testing.

2. The method of claim 1, further comprising:
   if the rejection decision is generated, sending a notification of rejection to the technology developer.

3. The method of claim 1, wherein the electronic marketplace comprises one or more webpages accessible to users over a network.

4. The method of claim 3, further comprising:
generating descriptive information for the function block using the report; and
providing the descriptive information on a webpage associated with the function block on the electronic marketplace.

5. The method of claim 4, wherein the descriptive information comprises an indication of performance of the function block on one or more computing platforms.

6. The method of claim 5, wherein the indication of performance of the function block comprises:
a minimum time associated with execution of the function block on each of the one or more computing platforms,
a maximum time associated with execution of the function block on each of the one or more computing platforms, and
an average time associated with execution of the function block on each of the one or more computing platforms.

7. The method of claim 1, wherein the marketplace computer is operated by a marketplace operator and the method further comprises:
providing, by the marketplace operator, an indication of acceptance of a non-disclosure agreement corresponding to the function block.

8. The method of claim 1, wherein the error handling testing and the vulnerability testing are performed by a static program analysis of source code associated with the function block, whereby the function block is not executed during the error handling testing and the vulnerability testing.

9. The method of claim 1, wherein the error handling testing and the vulnerability testing are performed by a dynamic program analysis of code associated with the function block, whereby the function block is executed during the error handling testing and the vulnerability testing.

10. A method of performing verification and validation of automation software for distribution on an electronic marketplace, the method comprising:
receiving a testing application from a marketplace provider;
performing testing of one or more function blocks in an example project using the testing application to yield test results comprising a listing of automation system resources required by the one or more function blocks, wherein the testing comprises: (i) identifying variables and operations included in the one or more function blocks, (ii) performing error testing on the one or more function blocks to yield error test results, and (iii) performing vulnerability testing on the one or more function blocks using a list of known vulnerabilities for automation system code to yield vulnerability test results;
generating a digitally signed report based on the one or more function blocks, the error test results, and the vulnerability test results;
sending the digitally signed report and the automation software to the marketplace provider; and
sending a request to the marketplace provider requesting release of the one or more function blocks via the electronic marketplace.

11. The method of claim 10, further comprising:
encrypting the one or more function blocks prior to the sending of the automation software to the provider.

12. The method of claim 10, further comprising:
prior to sending the request to the marketplace provider requesting release of the one or more function blocks, receiving a report from the marketplace provider comprising performance test results indicative of performance of the one or more function blocks on one or more target platforms.

13. A system for performing verification and validation of third party code, the system comprising:
a network communication component configured to receive one or more function blocks and metadata indicating functionality provided by the one or more function blocks from a technology developer;
a testing processor configured to:
identify variables and operations included in the function blocks and one or more automation system resources required by the function blocks,
perform error handling testing on the one or more function blocks to yield error test results,
perform vulnerability testing on the function blocks using a list of known
vulnerabilities for automation system code to yield vulnerability test results, and
use one or more target platforms to perform performance testing on the one or more function blocks to yield performance test results, wherein the target platforms are selected based on the functionality provided by the one or more function blocks;
a report generation component configured to generate a report based on the variables and operations included in the one or more function blocks, the error test results, the vulnerability test results, the performance test results, and the one or more automation system resources required by the function blocks, wherein the report is sent to the technology developer using the network communication component; and
a marketplace listing component configured to release the one or more function blocks via one or more electronic marketplaces with a certification that the function block passed one or more of the error handling testing, the vulnerability testing, and the performance testing, wherein is the release is performed in response to receiving an approval of the release from the technology developer.

14. The system of claim 13, wherein the marketplace listing component is further configured to provide descriptive information for the one or more function blocks associated with the report to each of the one or more electronic marketplaces for distribution with the one or more function blocks.

15. The system of claim 13, wherein the testing processor performs the error handling testing and the vulnerability testing using a static program analysis of source code associated with the one or more function blocks, whereby the one or more function blocks are not executed during the error handling testing and the vulnerability testing.

16. The system of claim 13, wherein the one or more target platforms perform the error handling testing and the testing processor performs the vulnerability testing using a dynamic program analysis of source code associated with the one or more function blocks, whereby the one or more function blocks are executed during the error handling testing and the vulnerability testing.

* * * * *